Jan. 22, 1929.

N. G. BRUCE 1,700,091

PACKING RING

Filed Nov. 27, 1925

Inventor
Nigel G. Bruce,

By O.E.Bee

Attorney

Patented Jan. 22, 1929.

1,700,091

UNITED STATES PATENT OFFICE.

NIGEL G. BRUCE, OF AKRON, OHIO, ASSIGNOR TO THE GOODYEAR TIRE & RUBBER COMPANY, OF AKRON, OHIO, A CORPORATION OF OHIO.

PACKING RING.

Application filed November 27, 1925. Serial No. 71,605.

My invention relates to packing rings and more particularly it relates to a type of packing ring adapted to provide a seal between the wall of a cylinder and its associated piston.

Packing rings of the above designated character are commonly employed in the cylinders provided in train-control systems for the purpose of operating the brakes through the medium of compressed air. A special shape of packing ring, commonly referred to as a cup-packing, has been developed for this service. The cup consists usually of an annular flanged portion which is adapted to secure the packing to the piston, and a depending or lip portion which is adapted to overhang the piston and to provide a seal by engagement with the wall of the cylinder. Obviously, packing intended for such service should function with high efficiency.

It has been found, however, that when wear resistant materials are employed in the construction of the cup, to reduce leakage from abrasion and the effects of lubricating oils, that the packing has insufficient flexibility to form a perfect seal when a relatively low initial air pressure is applied to the piston. When the train equipment is operated in cold climates, the lubricating oil is apt to coagulate and to pull the lip of the cup away from the wall of the cylinder. When the brakes are applied under such conditions, there is often so great a leakage around the piston that satisfactory and efficient service is impossible.

The objects of the invention are to improve the construction of the packing by increasing the flexibility thereof, and to provide a packing which will form an efficient seal under difficult operating conditions.

In the drawings, which illustrate the principles of the invention:

Figure 1:
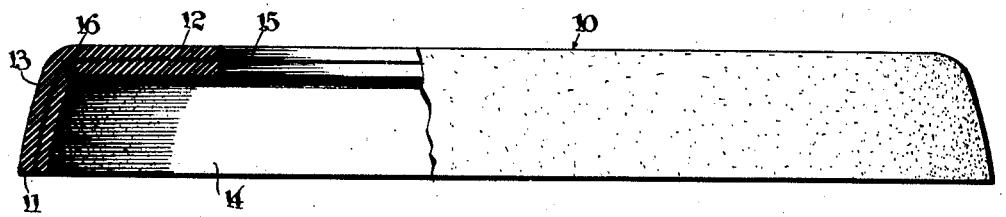
Fig. 1 is a view partially in elevation and partially in section of a preferred form in the packing.

The packing shown in Fig. 1 comprises a cup-shaped member 10 having a substantially frustro-conical side wall or lip 11, and a flat inwardly projecting annular portion or flange 12, secured thereto. Preferably the packing is made by superposing a desired number of layers of fabric and rubber, of a composition which will offer a high resistance to the deteriorating effects of oil, in a mold, and in vulcanizing under heat and pressure to form a cup-packing of the desired shape. A packing so manufactured has smooth outer and inner walls 13 and 14 with the fabric reinforcements 15 regularly disposed therebetween. The inherent properties of the materials employed, however, render the cup too stiff, as described above, and to increase the flexibility there is provided a recess or channel 16 in the inner wall 14 at the bend between the lip 11 and the flange 12. While a groove of any contour may be employed, a recess of substantially circular cross-section is preferred, as it provides a high degree of flexibility for the cup without an appreciable sacrifice in its strength.

Figure 2:
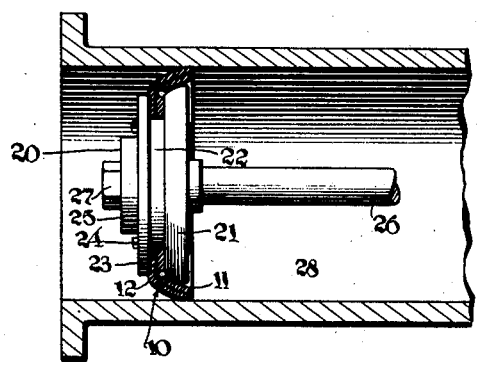
Fig. 2 is a longitudinal cross-sectional view of a cylinder and piston having a cup-packing assembled thereon.

The packing is shown as it is assembled in a conventional type of air-brake cylinder in Fig. 2. The piston 20 is provided with a portion 21 somewhat conical in form and a reduced cylindrical portion 22 over which the packing 10 is adapted to be placed. A metal ring 23 is provided to clamp the flange 11 of the cup against the conical portion 21 of the piston and may be secured by any suitable means, such as bolts 24. The piston 20 is also provided with an additional circular portion 25 which receives the piston rod 26 and to which it is secured by a bolt 27.

When the piston is positioned within the cylinder 28, the lip 11 of the packing 10 overlaps the portion 21 of the piston and forms a seal between the relatively movable parts. When air under pressure is initially admitted to the cylinder, leakage will occur if the packing ring is worn out, or if the lip is too stiff to respond to the relatively low initial pressure to swell out and contact with the wall of the cylinder at all points. By employing materials of the types indicated above, the packing may be given sufficient strength to resist in a satisfactory manner the effects of wear and by forming the packing with the recess 16, the lip has sufficient flexibility to effect a firm contact with the wall of the cylinder under the influence of comparatively low pressure.

Figure 3:
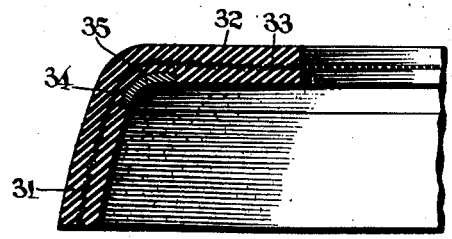
Fig. 3 is a fragmentary cross-sectional view of a modified form of the invention.

A modified means for increasing the flexibility of the packing is shown in Fig. 3. The cup comprises, in common with the preferred form of the invention, a lip portion 31 and flange portion 32 of rubber composition suitably reinforced with fabric 33. Increased flexibility is obtained by forming a relatively wide groove 34 in the wall of the cup, and inserting therein a strip of relatively soft rubber 35. The increased dimension of the groove imparts a high degree of flexibility, while the soft rubber strip vulcanized to the body of the cup maintains the strength at a desirable value.

From the foregoing description it will be apparent that means are provided, which while simple in construction, are effective to remove a serious objection to packing rings intended for service wherein a long life and high flexibility are required. While a preferred form of construction and a single modification thereof have been described in detail, other constructions will readily suggest themselves to those skilled in the art. It is also obvious that the invention is not limited to packings having a specific shape or adapted solely for service in air brake cylinders, and it is intended, therefore, that only such limitations should be imposed as are indicated by the scope of the following claims.

What I claim is:

1. A packing ring comprising a substantially cup-shaped member comprising outer and innner plies and an interposed reinforcing ply, said inner ply having an annular channel formed therein adjacent the base of the member and said channel extending from the interior of the member to the reinforcing ply.

2. A packing ring comprising a substantially cup-shaped member comprising outer and inner plies and an interposed reinforcing ply, said inner ply having an annular channel substantially circular in cross-section formed therein adjacent the base of the member and said channel extending from the interior of the member to the reinforcing ply.

In witness whereof, I have hereunto signed my name.

NIGEL G. BRUCE.